United States Patent
Langels et al.

(10) Patent No.: US 10,372,790 B2
(45) Date of Patent: Aug. 6, 2019

(54) SYSTEM, METHOD AND APPARATUS FOR GENERATING HAND GESTURE ANIMATION DETERMINED ON DIALOGUE LENGTH AND EMOTION

(71) Applicant: Plotagon AB, Stockholm (SE)

(72) Inventors: Linus Langels, Visby (SE); Philip Edner, Stockholm (SE); Jonas Löfgren, Nacka (SE)

(73) Assignee: Plotagon AB Corporation, Stockholm (SE)

(*) Notice: Subject to any disclaimer, the term of this patent is extended or adjusted under 35 U.S.C. 154(b) by 0 days.

(21) Appl. No.: 14/901,013

(22) PCT Filed: Jun. 27, 2014

(86) PCT No.: PCT/IB2014/001794
§ 371 (c)(1),
(2) Date: Dec. 22, 2015

(87) PCT Pub. No.: WO2014/207563
PCT Pub. Date: Dec. 31, 2014

(65) Prior Publication Data
US 2016/0292131 A1    Oct. 6, 2016

Related U.S. Application Data

(60) Provisional application No. 61/862,470, filed on Aug. 5, 2013, provisional application No. 61/840,375, filed on (Continued)

(51) Int. Cl.
*G06F 17/21* (2006.01)
*G06F 3/0484* (2013.01)
(Continued)

(52) U.S. Cl.
CPC .......... *G06F 17/211* (2013.01); *G06F 3/0484* (2013.01); *G06F 3/04815* (2013.01);
(Continued)

(58) Field of Classification Search
None
See application file for complete search history.

(56) References Cited

U.S. PATENT DOCUMENTS 8,207,971 B1 * 6/2012 Koperwas ............... G06T 13/40
345/473
9,214,036 B1 * 12/2015 Kanyuk .................. G06T 13/40
(Continued)

FOREIGN PATENT DOCUMENTS

WO    WO 2010045735 A1 *    4/2010    ......... G06F 3/04817

OTHER PUBLICATIONS

Beskow, Jonas. "Rule-based visual speech synthesis." EUROSPEECH '95. 4th European Conference on Speech Communication and Technology. 1995.*

*Primary Examiner* — Yi Wang
(74) *Attorney, Agent, or Firm* — Van Dyke Law; Raymond Van Dyke

(57) ABSTRACT

System, method and apparatuses directed to a paradigm of manuscript generation and manipulation combined with contemporaneous or simultaneous visualization of the text or other media being entered by the creator with emotion and mood of the characters being conveyed graphically through rendering. Through real time calculations, respective characters are graphically depicted speaking and interacting physically with other characters, pursuant to directive found in a manuscript text.

23 Claims, 6 Drawing Sheets

Related U.S. Application Data on Jun. 27, 2013, provisional application No. 61/840,246, filed on Jun. 27, 2013, provisional application No. 61/840,397, filed on Jun. 27, 2013.

(51) Int. Cl.
| | | |
|---|---|---|
| *G11B 27/031* | (2006.01) | |
| *G06F 3/0481* | (2013.01) | |
| *G06T 19/00* | (2011.01) | |
| *G11B 27/34* | (2006.01) | |
| *G06F 3/16* | (2006.01) | |
| *G06F 17/24* | (2006.01) | |
| *G06T 13/40* | (2011.01) | |
| *G06T 13/20* | (2011.01) | |

(52) U.S. Cl.
CPC .......... *G06F 3/04847* (2013.01); *G06F 3/167* (2013.01); *G06F 17/24* (2013.01); *G06T 13/20* (2013.01); *G06T 13/40* (2013.01); *G06T 19/003* (2013.01); *G11B 27/031* (2013.01); *G11B 27/34* (2013.01); *G06T 2213/04* (2013.01); *G06T 2213/12* (2013.01)

(56) References Cited

U.S. PATENT DOCUMENTS

| | | | | |
|---|---|---|---|---|
| 2003/0074561 | A1* | 4/2003 | Guenther | G06F 21/10 713/176 |
| 2004/0001106 | A1* | 1/2004 | Deutscher | G06F 17/30017 715/838 |
| 2008/0269958 | A1* | 10/2008 | Filev | B60W 50/10 701/1 |
| 2008/0307304 | A1* | 12/2008 | Feiler | G06T 13/00 715/700 |
| 2010/0057455 | A1* | 3/2010 | Kim | G10L 15/265 704/235 |
| 2012/0229475 | A1* | 9/2012 | Sheridan | G06T 13/40 345/474 |
| 2012/0323938 | A1* | 12/2012 | Skeen | G06F 17/30752 707/754 |

* cited by examiner

SYSTEM, METHOD AND APPARATUS FOR GENERATING HAND GESTURE ANIMATION DETERMINED ON DIALOGUE LENGTH AND EMOTION

CROSS REFERENCE TO RELATED APPLICATIONS

The present application claims the benefit of earlier-filed Patent Cooperation Treaty (PCT) Patent Application Serial No. PCT/IB2014/001794, filed Jun. 27, 2014; and also claims the befit of related patent applications PCT Patent Application Serial No. PCT/IB2014/001791, filed Jun. 27, 2014; PCT Patent Application Serial No. PCT/IB2014/001777, filed Jun. 27, 2014; and PCT Patent Application Serial No. PCT/IB2014/001832, filed Jun. 27, 2014; as well as the benefit of U.S. Provisional Patent Application Ser. No. 61/840,246, filed Jun. 27, 2013; U.S. Provisional Patent Application Ser. No. 61/840,375, filed Jun. 27, 2013; U.S. Provisional Ser. No. 61/840,397, filed Jun. 27, 2013; and U.S. Provisional Ser. No. 62/862,470, filed Aug. 5, 2013, the contents of which are incorporated herein by reference.

FIELD OF THE INVENTION

The present invention is directed to new approaches and techniques for facilitating the creation, editing and visualization of a document, manuscript or other media, including animations therein, and the generation of body, hand, facial and lip animations.

BACKGROUND OF INVENTION

Currently, manuscripts, such as screen plays, are labor intensive and difficult to create. Although words are often good enough to convey an idea, for movie or screenplay depictions of a source written work, such as a novel, the meaning of the words and phrases employed must be placed in context or the scene, as well as actions and other non-verbal and visual cues.

Indeed, the conversion process for any source document into a manuscript, such as a scene and dialogue in a play, movie, narrative, commercials, training materials and a multitude of other contexts, is labor intensive and can be simplified. Additionally, the creation process itself can be enhanced and facilitated in the creation of an original, new work, with the incorporation of the subtleties of words, gestures, expressions, scenes and other context needs simplification.

However, in the creation of a document or manuscript, it would be advantageous to see an image of the instructions entered, such as a character in a scene doing something. The concurrent visualization of the work enables the creator to modify the document employing more of the senses than just if writing the scene on a typewriter or computer, for example. More particularly, the non-verbal subtleties inherent in viewing characters, such as during a dialogue, can speak volumes beyond the words, conveying emotion and mood by various body movements and gestures.

There is, therefore, a present need to provide a tool to augment the creative process, particularly in those processes involving the creation and manipulation of a manuscript involving scenes and characters from a novel or other text, whether an individual or collaborative effort, and including text, audio, visual and animation components.

There is also a present need to make this process as simple and automatic as possible for the creator, e.g., a technique that allows the creator to freely manipulate the medium, and have more control over the creative process, with more control over the rendering of characters in a manuscript story to include body language and gestures to the repertoire of expression through the employment of computer algorithms and techniques in conjunction with the manuscript creation process, thereby showing the characters speaking and otherwise emoting.

SUMMARY OF THE PRESENT INVENTION

The system, method and apparatuses of the present invention are directed to a paradigm of manuscript generation and manipulation combined with contemporaneous or simultaneous visualization of the text or other media being entered by the creator with emotion and mood of the characters being conveyed graphically through rendering. Through real time calculations, respective characters are graphically depicted speaking and interacting physically with other characters, pursuant to directive found in a manuscript text.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

Figure 1:
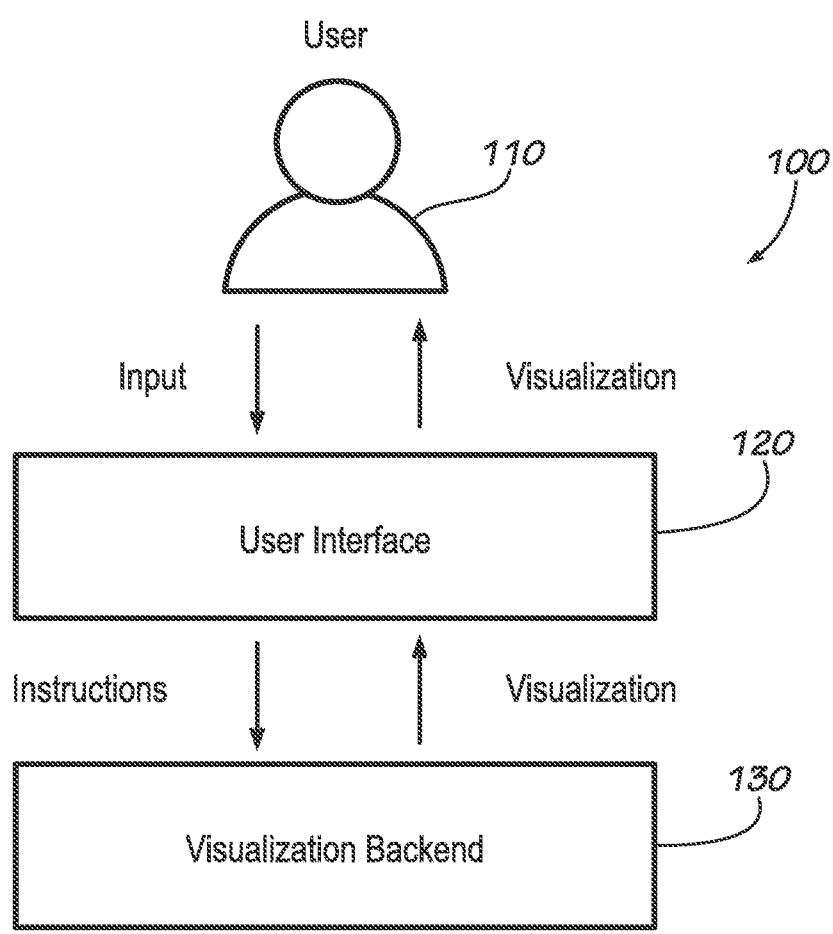
FIG. 1 is a representative view of a system and functionalities that may be employed in practicing aspects of the present invention in an exemplary configuration.

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

The instant invention is related to U.S. Provisional Patent Application Ser. No. 61/840,246, entitled "System, Apparatus and Method for Creation and Visualization of a Manuscript and/or Other Media," filed Jun. 27, 2013, U.S. Provisional Patent Application Ser. No. 61/840,375, entitled "System, Apparatus and Method for Camera Placement based on a Manuscript," filed Jun. 27, 2013, U.S. Provisional Patent Application Ser. No. 61/840,397, entitled "System, Apparatus and Method for Generating hand Gesture Animation Determined on Dialogue Length and Emotion," filed Jun. 27, 2013, and U.S. Provisional Patent Application Ser. No. 62/862,470, entitled "System, Apparatus and Method for Formatting a Manuscript Automatically," filed Aug. 5, 2013 (designated herein as "the related applications"), the specifications and drawings of which are incorporated herein by reference.

The related applications and the instant Specification are generally directed to new methods, systems, apparatuses and techniques to free authors and creators from difficult, time-consuming and ministerial tasks through the use of powerful new tools to facilitate and better visualize content, convert that content into various forms per the creative process, and otherwise augment the creative process. Various discrete approaches are addressed herein.

As discussed, in one embodiment of the present invention, the aforesaid related applications and the instant application are directed to improved methodologies and systems for the creation and editing of a manuscript, such as a screen play or movie script, which involves two or more aspects of scene description, such as character statements and scenes a faire. For example, a movie, play or other narrative involves both the words (and perhaps gestures or actions) of characters, and associated scene depictions, both visual and aural. A writer often needs to place the spoken words in an appropriate context for the meaning to accrue. Unlike a novel, which is purely textual and much is left to the imagination, a visual work must visualize the scene in addition to the words. A manuscript must thus delineate the full ambit of the spoken and visual contexts. During the creative process leading up to the visual work, however, those two aspects, dialogue and scene, go hand in hand.

The related applications and the instant application present various paradigms and tools to improve the creation and manipulation of manuscript works by facilitating the process of integrating the words with the narrative, along with other effects, such as sound, music, animation and more. With the increasing movement to individual or self-publication, individuals need better tools to so create and proliferate their own works of art, to transform the raw text from a novel or story to a screenplay or movie, and otherwise manipulate the work along the way at their pace and in their way, personalizing the tools of the present invention, making them appeal to a mass audience of creative people.

With reference now to FIG. 1 of the DRAWINGS, there is illustrated an overview representative configuration of a paradigm or system of the instant invention, generally designated by the reference numeral 100. As shown, a user 110 generally interacts with a user interface, generally designated by the reference numeral 120, such as a computer, which connects to a variety of tools to implement the vision of the user in a so-called visualization backend, generally designated by the reference numeral 130, which employs elaborate and sophisticated hardware and software to create and embody the virtual environment representing the underlying work.

Generally, the system 100 lets the user 110 create a manuscript comprising a set of instructions using the user interface 120. The instructions are then processed by the visualization backend 130, which creates a visualization of the manuscript, such as characters and ambience in a film or movie. The visualization is shown to the user 110 on the user interface 120 in real time, e.g., on a computer or other screen. When the user 110 is finished, the visualization can be exported as a video file that can be shown in a video player or uploaded to servers or social media, as are understood in the art, and described further hereinbelow.

With further reference to FIG. 1, the user interface 120 is the method through which the user 110 of the system 100 creates and edits their manuscript, and where the real time visualization of the manuscript is shown. It should be understood that the interface 120 works both on non-touch screens, where the user interacts with a mouse and keyboard, and on touchscreens where the user interacts by tapping the screen.

Figure 2:
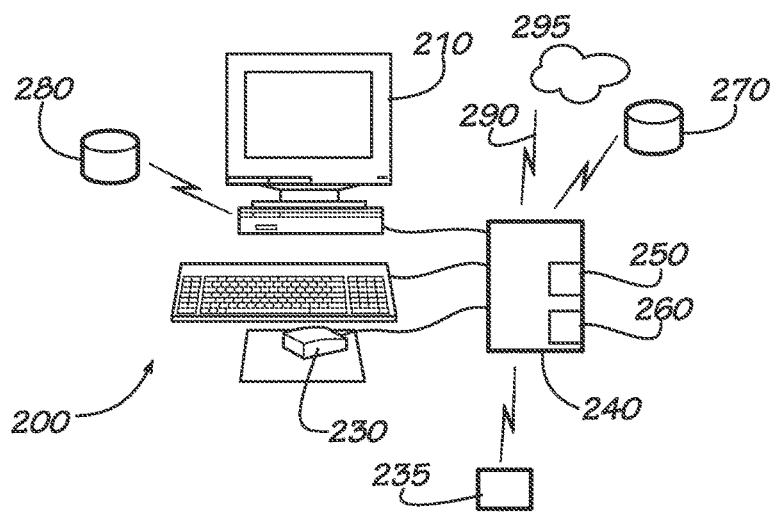
FIG. 2 is a representative view of a system and components that may be employed in practicing aspects of the present invention in an exemplary configuration.

With reference now to FIG. 2 of the DRAWINGS, there is illustrated a representative configuration of a system and components that practice the principles of the present invention, generally designated by the reference numeral 200, as also described in the related applications. Within computer system 200 is a display, upon which images and text appear, generally designated by the reference numeral 210. It should be understood that the computer/display may be a PC, an iPad, a mobile device, or other devices having a display, as is understood in the art. Various other user interfaces are shown, such as a keyboard 220 and a mouse 230. Additional such user interfaces are possible and contemplated herein, such as joysticks, microphones for voice recognition input, cameras, etc., generally represented and designated by the reference numeral 235, which may be wireline, wireless or both, as is understood in the art.

It should be understood that touch screens (display 210, iPad, etc.) and other such input techniques may also be employed, as is understood in the art. Also illustrated are various hardware, generally designated by the reference numeral 240, which includes at least one processor 250 (with associated chipsets therefor) for running software programs, such as the tools depicted herein, and a memory 260 for storing the aforementioned program and data therein, as is understood in the art.

As shown in FIG. 1, a user inputs their work, such as a manuscript, using the keyboard 220, mouse 230 or other means, such as voice recognition 235. As discussed later, this form of input may not be in the preferred industry standard, such as the style for a screenplay, but instead may be less stylized and more to the user's writing tastes, e.g., free form textual input into a word processor, such as Microsoft Word or other such program. The user interface, such as user interface 120, with their work or progress thereof is illustrated on the display 210. As discussed, conventional techniques for screenplay or movie scripts or manuscripts involve a rather stylized document specifically delineating the character words and the scenes, as described. In such fashion, the manuscript of a book looks nothing like the book. The related applications and the instant specification are thus directed in at least one embodiment to systems, methodologies, apparatuses and techniques that facilitate the creation, conversion and use of these manuscripts from books or other source materials.

Figure 3:
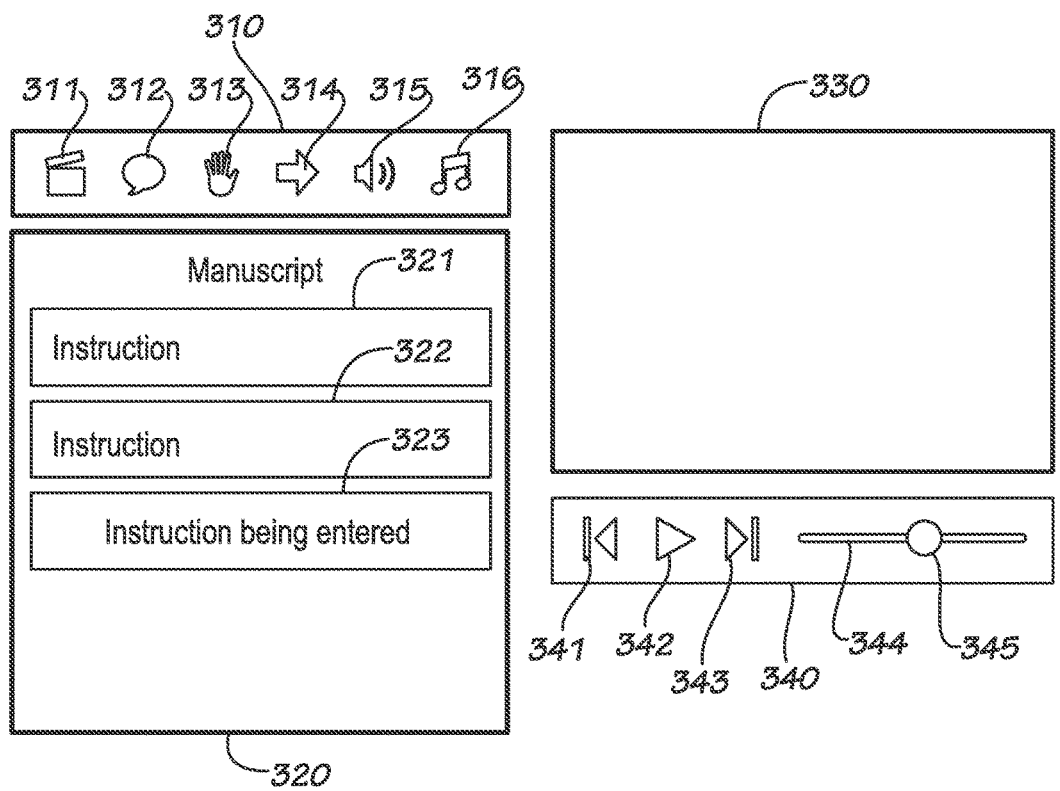
FIG. 3 is a representation of a software interface that may be displayed on the display of FIG. 2.

With reference now to FIG. 3 of the DRAWINGS, there is illustrated a software tool or interface program, generally designated by the reference numeral 300, pursuant to the principles of the present invention, which is displayed on the display 210. As described, the interface 300 provides an improved paradigm for the creation and modification of a manuscript, as also set forth in the related applications. It should be understood that the inclusion of the various related application embodiments into the instant case is exemplary only, and, as discussed hereinbelow, all, some or none of the subject matters set forth in the related applications can be employed in practicing the various inventive embodiments set forth in the instant invention.

For example, when writing a manuscript, a user may want to add a scene to portray the milieu for the words. As indicated, preferred industry manuscript standards have particular protocols for this process. The present invention provides easy-to-use tools to better automate the manuscript creation process, thereby better freeing the writer from the minutiae of the process.

With further reference to FIG. 3, there is illustrated therein a toolbar, generally designated by the reference numeral 310. The toolbar 310 lets the user easily add instructions to their manuscript. As illustrated, the toolbar 310 has a number of buttons, one for each type of instruction that can be added, and when the user clicks/taps on a button, an instruction of the corresponding type is added to the manuscript after the currently selected instruction. As illustrated, exemplary instruction buttons include a scene button, generally designated by the reference numeral 311, a dialogue button, generally designated by the reference numeral 312, an action button, generally designated by the reference numeral 313, a movement button, generally designated by the reference numeral 314, a sound button, generally designated by the reference numeral 315, and a music button, generally designated by the reference numeral 316.

As will be further discussed hereinbelow, a user may depress or click the various buttons 311-316 to initiate an insertion. It should be understood that additional and/or alternate buttons may so be deployed for the various functionalities which may differ in name but are similar in configuration.

With regard to a manuscript panel, generally designated by the reference numeral 320, this is where the user creates and edits the sequence of events, such as will be visualized in a film. Generally, the events in the manuscript are represented as instructions of different types, e.g., scene, dialogue, and action. The order in which the instructions occur in the manuscript is the order that the events will play out in the film, e.g., chronological order from start to finish. As shown in FIG. 3, there are three instructions set forth in the manuscript field or panel, generally designated by the reference numerals 321, 322 and 323, respectively. It should, of course, be understood in this embodiment and in the various other instructions and other embodiments herein, that there may be one, two, four or more such instructions visible. Furthermore, the present invention permits the adjustability of the number of such instructions visible to the user, pursuant to user preference and other reasons, as is understood in the art.

Figure 4:
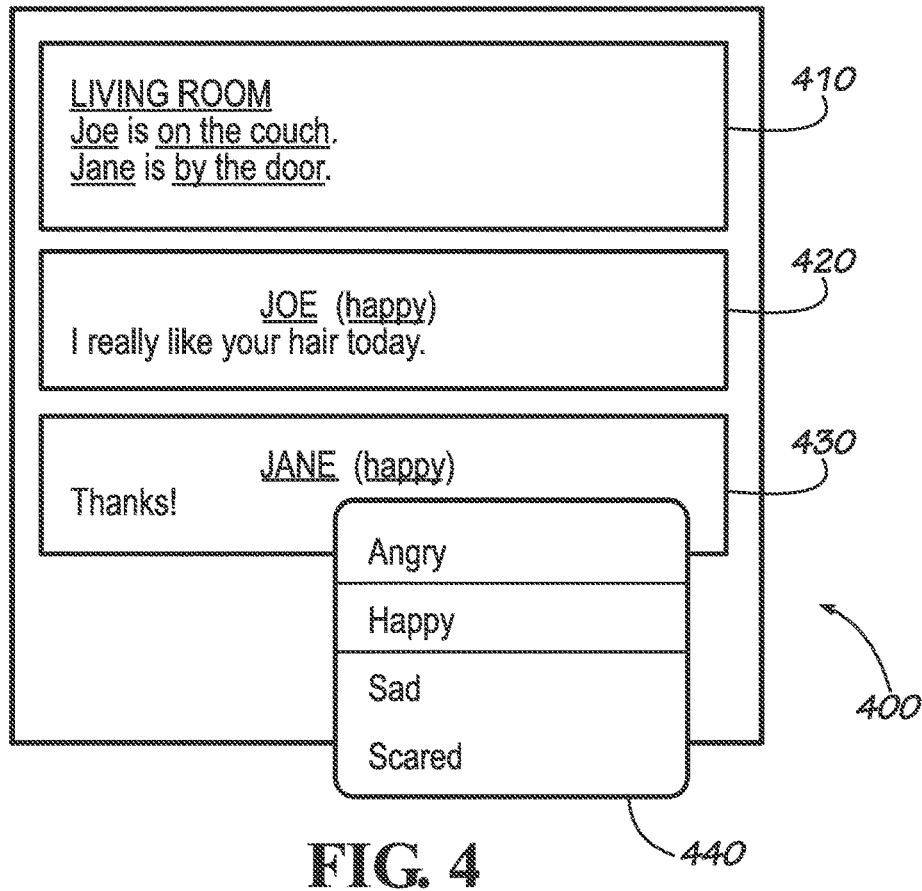
FIG. 4 is a representation of a software interface illustrating exemplary dialogue; that may be displayed on the display of FIG. 2.

With reference now to FIG. 4 of the DRAWINGS, there is shown a representative series of events, such as dialogue, in a manuscript field or panel generally designated by the reference numeral 400, with three instructions and dialogue set forth, generally designated by the reference numerals 410, 420 and 430, respectively. As illustrated, each instruction is shown as prose text that the user can easily read, just like a real manuscript. Some words in the text may, however, be underlined, e.g., who is talking and what they are saying. It should be understood that these underlined portions represent parameters that the user can edit for that instruction. Most parameters, e.g., where a scene takes place and who is in it, are edited by choosing from a list of options provided by the system 100/200, as discussed further hereinbelow, Some parameters, e.g., dialogue text, are edited by typing text freely into the particular instruction 410, 420 or 430, giving the user freedom of expression. It should be understood that for some parameters there are a set of instructions that can be added to the manuscript, and that these instructions have parameters, as described in more detail hereinbelow.

With further reference to FIG. 3, there is shown a visualization window, generally designated by the reference numeral 330, where the user sees the visualization or rendering of their manuscript. This is an area, for example, on the screen 210, where the aforesaid visualization backend 130 renders and draws the visualization, e.g., the scene with characters at a particular vantage or point of view, and perhaps with animations, sounds and/or music.

When the user is editing their manuscript in the manuscript panel 320, the visualization window 330 shows a preview frame of the currently-selected instruction within the visualization window, e.g., in this embodiment the third window or instruction 323/430 is being edited/added and is thus the currently-selected instruction. For example, when the user presses play, the visualization window 330 plays a visualization of the instructions as a film, starting from the selected instruction. The selection in the manuscript panel 320 follows along to show which instruction is being visualized at the moment. In other words, the text and the visualization of the text are synchronized in playback, permitting the user to see both the dialogue and the scene instructions along with the rendering of these commands by the aforesaid visualization backend 130.

With reference again to FIG. 4, instruction 430 is selected, e.g., by clicking/tapping, and the visualization of that scene in instruction 430 is displayed within the visualization window 330, and made available for editing. For example, clicking on a mood or expression indicator, such as the underlined word "happy" in instruction 430, a mood parameter window, generally designated by the reference numeral 440 pops up, offering a variety of options, with the option "Happy" being selected. As indicated, all of the underlined portions representing instructions or commands have parameters associated therewith. It is also on the selected instruction that playback will start when pressing the play button, such as beginning with instruction 430.

With reference again to FIG. 3, a transport controls panel, generally designated by the reference numeral 340, allows a user to start and stop playback of the visualization in panel 330, and also change which instruction is selected in the manuscript panel 320, i.e., forward and reverse. For example, a play/stop button, generally designated by the reference numeral 342 starts playing the visualization of the manuscript from the currently-selected instruction, as described hereinabove. Preferably, when the visualization is being played, the play/stop button 342 changes into a stop button, a dual capability understood in the art. Accordingly, pressing the stop button 342 stops playing the visualization, and reselects the instruction that was selected before playback started, i.e., resetting.

A back button, generally designated by the reference numeral 341, selects the instruction before the currently-selected instruction, and a next button, generally designated by the reference numeral 343, selects the instruction after the currently-selected instruction. Further, a slider, generally designated by the reference numeral 344, graphically illustrates which instruction is currently selected in the manuscript as the position of a handle 345 on the slider 344, the handle 345 being positioned at a point along the slide 344 representing the point of the particular scene in the whole work, as is understood in the art. When the user drags the handle 345 of the slider 344, the selected instruction in the manuscript changes to match, allowing the user control over the timeline. It should be understood that the user may manipulate the back 341 and forward 343 buttons, such as by clicking on them multiple times or holding the command down, to step through the work scene by scene, and accelerate either way to a scene of interest to focus there, move scenes forward or backward for style or coherency, etc.

It should be understood that the tools of the present invention provide a simplified mechanism to visualize manuscripts and format them pursuant to a variety of standards. As set forth thus far, a simplified presentation technique has been deployed, which a user may customize and employ to input the various commands and prose in an easy manner.

Figure 5:
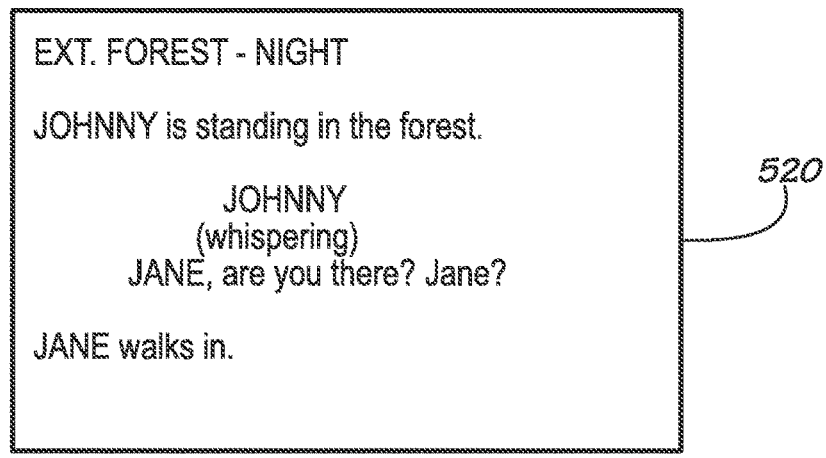
FIG. 5 is a representation of a window with text converted pursuant to the principles of the present invention and a switch for the text style conversion.

With reference now to FIG. 5 of the DRAWINGS, the user, after making the various inputs in the simplified manner described herein, may want them converted to a format according to an industry standard. In this manner, some professionals may edit their manuscripts in a professional format, for proofing for example. In the present invention, there is a method for choosing the format in which to display the manuscript, e.g. a switch, dropdown, checkbox, similar selector for a converter, generally designated by the reference numeral 510. This is shown in the Figure as a switch with the labels "Hollywood" and "Simple," with the professional standard selected and displayed, the simpler, original manuscript text being converted. It should be understood that the converter may be configured to automatically convert the entire manuscript to a new manuscript in a second format, or may convert a portion of the manuscript in the first format to the second format. The user, upon activation of the converter 510, preferably initiates the process. It should, of course, be understood that the user may provide guidelines or commands to automatically do the conversion, e.g., upon completion of an event, e.g., a chapter or the work as a whole.

For example, the writer, in simple style, may write: Exterior Forrest Night. The switch to Hollywood style becomes EXT. FORREST—NIGHT, which is Hollywood preferred. Similarly, Johnny and Jane may be written in lower case for ease and simplicity of writing, but when switched are capitalized. Similarly for indentations and other more stylized formulations, the conversions from simple to Hollywood style are done by the computer processor 250 automatically, and the writer/creator need only flip the converter or switch 510, i.e., slide the icon or bar over, click the word Hollywood or Simple, or otherwise select the function to be performed, e.g., using a mouse 230 or a finger on a touch screen 210.

In any event, in at least one embodiment the present invention is directed to facilitating the creation and ready conversion of text into different formats. Although two are shown here, in the case of multiple writers, each may have their own style, and convert another's style over to a preferred style, and later to Hollywood or other styles. Of course, the styles employed must include sufficient markers or codes for the conversion, e.g., the word Exterior to EXT. With improved heuristics, the markers and their context will be correctly interpreted by the processor. It should be understood that in time, the linguistic contexts may become machine interpretable without the insertion of specific codes and markers.

It should, of course, be understood that although an improved dialogue conversion tool has been described and illustrated in some detail herein, these are exemplary of the broader applications in the implementation of the instant invention. For example, these tools may be employed in other contexts, such as used in the movie industry, which would include, for example, music, effects, interactions and movements (human, equipment, etc.) to capture the visual subtleties. The principles of the present invention are, therefore, amenable to the preparation of various creative endeavors, whether in the form of a manuscript or other written format, movies or plays or other visual forms, or other means, so long as the creation of them in one format and ready conversion to another is possible.

Thus, as mentioned, the tools of instant invention readily facilitate inter-conversion between formats. Alternatively, some aspects or all may be employed in the creation process. For example, a user may wish to have an entirely freeform technique that employs few or none of the scene/character insertion tools, instead writing them out in a very un-Hollywoodese style. The conversion of this more raw text into Hollywoodese would nonetheless occur so long as sufficient markers are employed, e.g., the word Exterior, to enable the conversion process to make the conversion, as discussed hereinabove.

Pursuant to the present invention, when the user changes the format in which to display the manuscript, e.g. by flipping the switch 510, the manuscript is automatically reformatted to match the chosen format, without the user having to retype anything. For example, when the chosen manuscript format uses specific prefixes or suffixes for different types of scenes or characters, these are inserted automatically. For example when choosing standard Hollywood manuscript format, "EXT." for 'exterior' and "INT." for 'interior' are inserted automatically, depending on where the scene takes place, as shown in FIG. 5 and generally designated by the reference numeral 520.

As discussed, the manuscript that the user creates pursuant to the teachings of the present invention includes a number of instructions. Each instruction represents something that happens in the film, e.g., "John kisses Jane". The instructions provide the aforesaid visualization backend 130 with the information needed to visualize and otherwise embellish the manuscript, as described in more detail hereinbelow.

Each instruction has a type, e.g., dialogue or action, which determines how the user interface 120 displays the instruction and how the backend 130 visualizes it. Multiple instructions of the same type can be added to the manuscript. The type determines which parameters an instruction has. A parameter is a container for data that tells the backend 130 what to visualize, e.g. who is talking or what they are saying. Each parameter pursuant to this embodiment of the present invention preferably has three pieces of data:

First, an identifier or ID, which is a unique identifier used to identify the correct content in the content database, e.g., "animation.kiss" or "location.deskleft;"

Second, a name or NAME to display for the content in the option list when the user chooses the content, e.g., "Kiss" or "Desk (left);" and Third, a text or TEXT to display in the textual representation of the instruction used in the manuscript, e.g., "kisses" or "sitting to the left at the desk."

The various types of instructions, such as set forth in the aforesaid toolbar 310 for easy access, are now described, beginning with a scene instruction.

Figure 6:
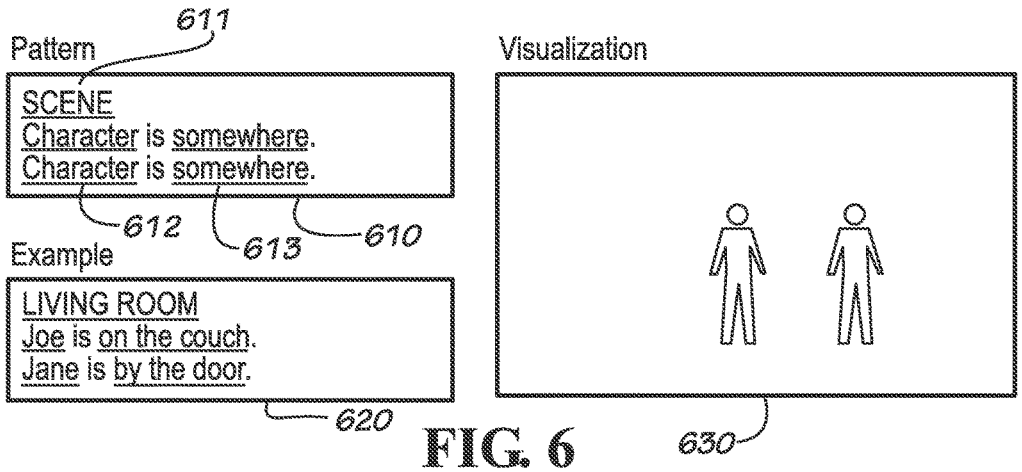
FIG. 6 is a representation of a scene instruction box with input fields therein, as depicted in FIG. 3.

With reference now to FIG. 6 of the DRAWINGS, there are shown exemplary parameters and fields for data insertion into a scene instruction box, generally designated by the reference numeral 610, to illustrate a scene. A scene instruction represents a new scene in the manuscript. The user chooses where the scene takes place, who is in it, and where they are in the environment. As shown, scene instruction box 610 preferably includes three fields for data entry, including a scene or environment descriptor 611, such as a scene number, which is chosen from among a list of potential environments available in a content database described hereinbelow; a character descriptor 612, which set forth the characters in a scene and which are again preferably chosen from a list of characters in said content database; and a location descriptor 613, which defines the position of that character within that particular scene and in the environment within the manuscript, e.g., on a couch or beside a door. The positions are likewise preferably chosen from a list of available positions, where two characters cannot occupy the same position. After so inputting the scene instruction 610 information, the writer can then enter that information, whereupon the data is stored, such as within the memory 260.

It should be understood that additions or alterations can be made to the parameters, e.g., add or delete a character, provided the aforesaid content database 270 (and/or memory 260) is updated accordingly, thereby keeping the parameters known and coherent.

An exemplary scene instruction is shown in FIG. 6 and generally designated by the reference numeral 620, and the visualization of the scene so described is set forth in the aforesaid visualization panel, generally designated by the reference numeral 630. It should be understood that when the scene instruction is so visualized, the "camera" or virtual point of view preferably shows an establishing shot of the entire scene with all characters it. The exact position of the virtual camera within the virtual environment is determined by a camera placement system, which is set forth and described more fully hereinbelow. Further, the backend 130 loads the correct environment and characters from the aforesaid content database and places the characters within the environment, e.g., in a room, at their correct position for the display to the user in the visualization panel 630. It should also be understood that the environment may contain an ambience sound that is played when the scene instruction is visualized. The environment, characters and ambience sound will preferably stay loaded until a new scene instruction replaces the current one or until the last instruction is reached.

Figure 7:
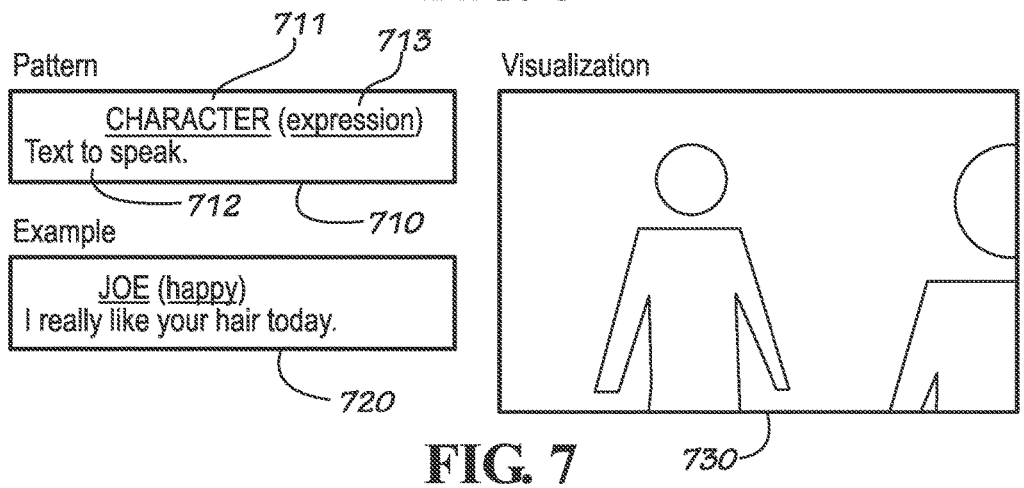
FIG. 7 is a representation of a dialogue instruction box with input fields therein, as depicted in FIG. 3.

With reference now to FIG. 7 of the DRAWINGS, the writer may want to enter dialogue for their characters, such as uttered in the source novel, and exemplary parameters and fields for data insertion into a dialogue instruction box, generally designated by the reference numeral 710. As illustrated, dialogue instruction box 710 preferably includes three fields for data entry, including a character descriptor 711, e.g., who is talking, a words or text descriptor 712 to indicate what that character is saying, and an expression or mood descriptor 713, indicating the particular expression at that moment within that dialogue. As with the scene information, the character and expression field information may be selected from a list. The text 712 is usually input as free text, as discussed hereinabove. After so inputting the dialogue instruction 710 information, the writer can then enter that information, whereupon the data is stored, such as within the memory 260.

It should be understood that the visualization of the dialogue, such as in the aforesaid visualization panel 330, may be stylized. For example, when the instruction 710 for individual dialogue is visualized, the camera may show an over-the-shoulder shot of the character speaking from over the shoulder of the character being spoken to. This is a common camera angle in films when two characters are speaking. The exact position of the virtual camera within the virtual environment is determined by the aforementioned camera placement system, as described in more detail hereinbelow.

It should be understood that in another embodiment of the present invention, when the instruction 710 is played, the text 712 that the user has written is preferably converted into audio by a text-to-speech system, and the lips of the characters or avatars are synchronized realistically to the speech by a lip synchronization system, as described in more detail hereinbelow. Depending on the expression 713 chosen, a body language system, also described in more detail hereinbelow, will play an animation on the character that represents that expression 713, including both hand gestures and facial expressions, e.g., anger or happiness.

An exemplary dialogue instruction is shown in FIG. 7 and generally designated by the reference numeral 720, and the visualization of the scene is set forth the aforesaid visualization panel, generally designated by the reference numeral 730, e.g., in the over-the-shoulder shot.

Figure 8:
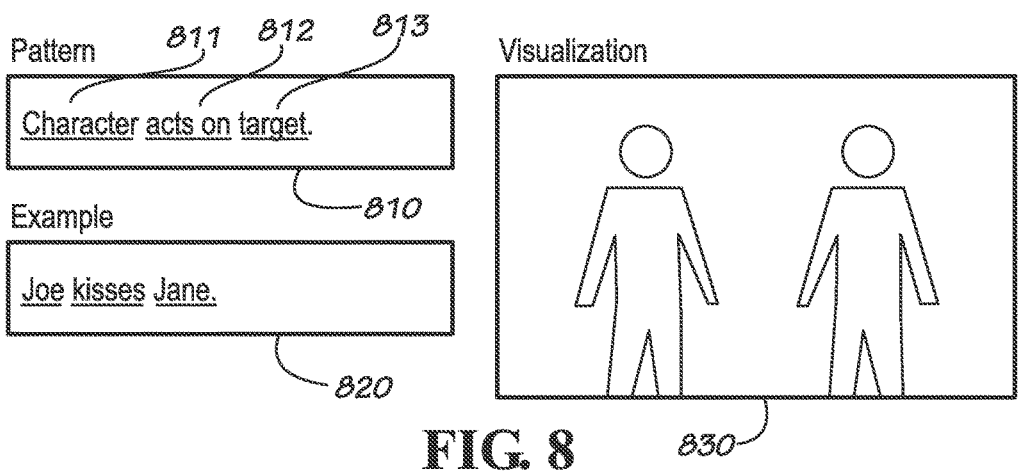
FIG. 8 is a representation of an action instruction box with input fields therein, as depicted in FIG. 3.

With reference now to FIG. 8 of the DRAWINGS, the writer may want to indicate actions for their characters, such as one character acting upon another, and what they do and to whom the action is done. Exemplary parameters and fields for data insertion into an action instruction box, generally designated by the reference numeral 810, indicate the actions desired. As illustrated, action instruction box 810 includes three fields for data entry, including a character descriptor 811, who is doing the action, an action descriptor 812 to indicate the action being done, e.g., a kiss, and a target descriptor 813, indicating the character in the scene being acted upon. As with the other parameters, each of these can be chosen from a list in a content database, with the caveat that the actor cannot also be the one acted upon. When the instruction 810 is visualized by the backend 130, the virtual camera depicts the scene in the aforesaid visualization panel 830, which in this embodiment shows both characters in a medium shot. The exact virtual position of the camera is determined by the aforementioned camera placement system.

An exemplary action instruction is shown in FIG. 8 and generally designated by the reference numeral 820, and the visualization of the scene is set forth in the aforesaid visualization panel 830, e.g., in the aforementioned medium shot.

Figure 9:
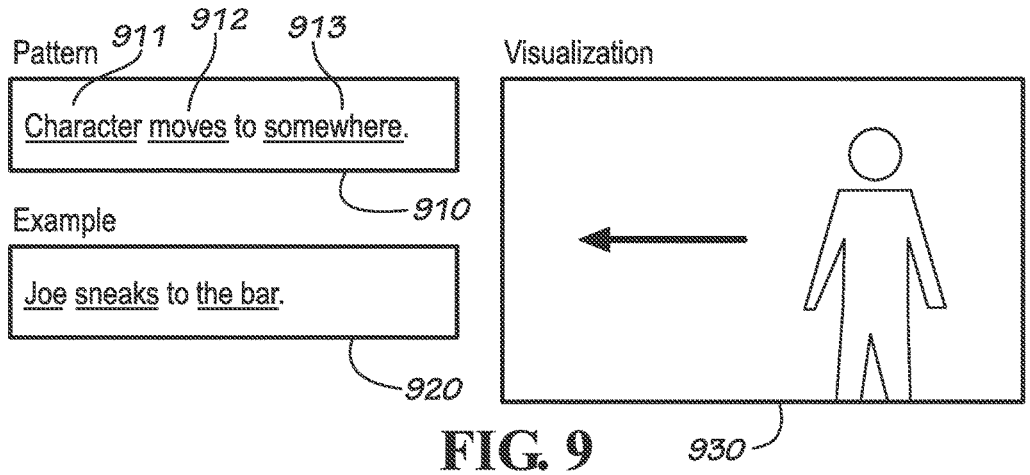
FIG. 9 is a representation of a movement instruction box with input fields therein, as depicted in FIG. 3.

With reference now to FIG. 9 of the DRAWINGS, the writer may want to indicate movements for their characters, such as a character moving from one position in the environment to another position in the environment, where the user chooses who moves, how they move and to where they move. As illustrated, a movement instruction box 910 includes three fields for data entry, including a character descriptor 911, who in the scene is moving, a movement descriptor 91:2 to indicate what type of movement is employed, e.g., sneaking, and a location descriptor 913, indicating the particular position in the environment to which the character moves, e.g., the bar. As with the other parameters, these descriptors also may be selected or chosen from a list. When the movement instruction 910 is visualized, the aforesaid camera in this embodiment of the present invention preferably first shows a shot of the character moving away from their previous location, and then cut to a shot of the character arriving at their new location. It should, of course, be understood that other or additional camera shots can be employed.

Figure 10:
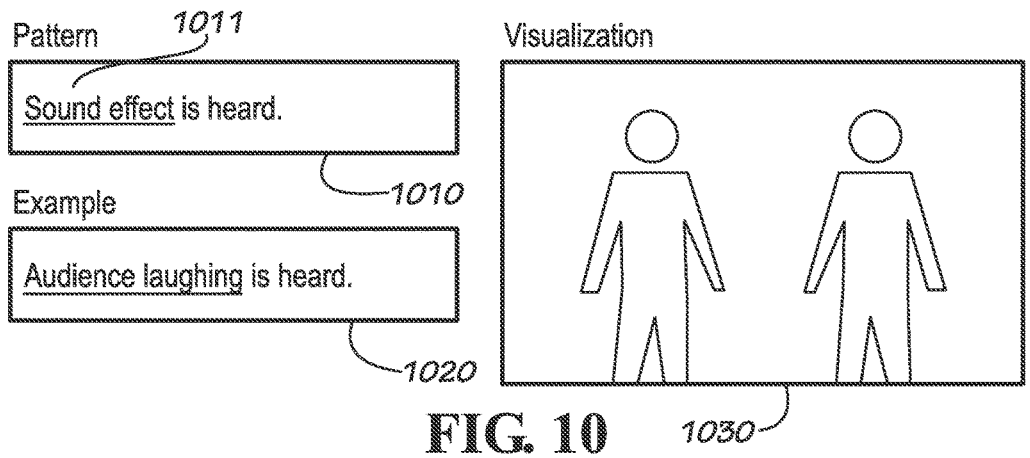
FIG. 10 is a representation of a sound instruction box with input fields therein, as depicted in FIG. 3.

With reference now to FIG. 10 of the DRAWINGS, the writer may want to indicate a sound effect or effects for a scene, such as heard by a character and apart from dialogue. Exemplary parameters and fields for data insertion into a sound instruction box, generally designated by the reference numeral 1010, illustrate the sound effect desired. As illustrated, sound instruction box 1010 includes a sound effects descriptor 1011, which is chosen by the user to reflect the sound in the scene environment, and which may be selected from a list, as described. An exemplary sound effects instruction is shown in FIG. 10 and generally designated by the reference numeral 1020, e.g., audience laughing, and the visualization of the scene with the sound effect is set forth in the aforesaid visualization panel, generally designated by the reference numeral 1030, e.g., in the aforementioned medium shot. When the instruction 1020 is visualized, the camera preferably shows the same shot as the instruction before. For example, if the instruction before was a dialogue instruction, then the shot will be an over the shoulder shot. When the instruction 1020 is played, the inserted sound effect will preferably play until completion.

It should be understood that the user of the aforesaid manuscript panels in conjunction with the visualization panels sees both manifestations of the manuscript contemporaneously, simultaneously or substantially simultaneously, i.e., a slight delay, as is common in computer calculation intensive endeavors, such as rendering. In any event, the experience of the user of the conjunctive panels of both the instructions and the visualization of same, allows the user to better understand their own creation, and, by virtue of being able to move back and forth, and edit in either panel, the user is better able to make changes to the work. It should also be understood that changes made in the visualization panels are also translated back to the manuscript panels, and the master manuscript maintained.

Figure 11:
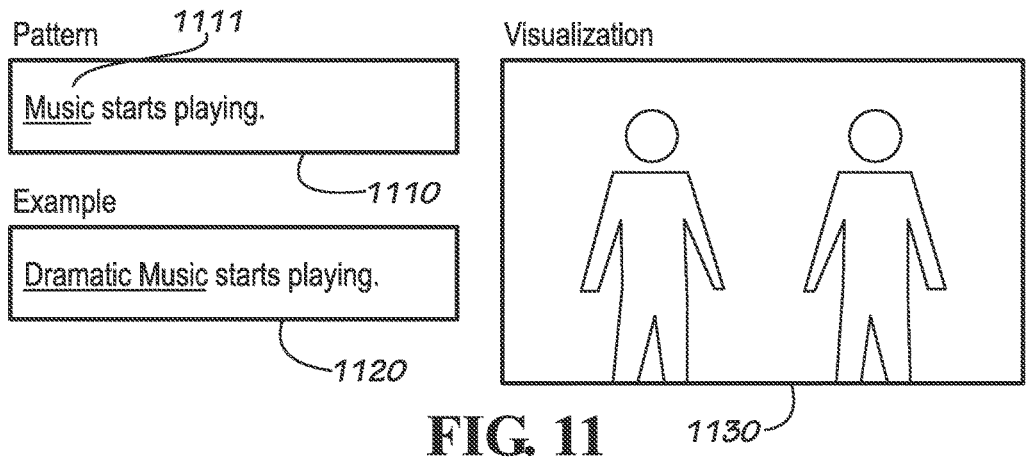
FIG. 11 is a representation of a music instruction box with input fields therein, as depicted in FIG. 3.

With reference now to FIG. 11 of the DRAWINGS, the writer may want to indicate a musical effect or effects for a scene, such as heard by a character, to set the mood for the scene, indicate a theme or other purpose. Exemplary parameters and fields for data insertion into a music instruction box, generally designated by the reference numeral 1110, illustrate the musical effect desired. As illustrated, music instruction box 1110 includes a music effects descriptor 1111, which is chosen by the user, e.g., to reflect a theme in the scene environment, such as dramatic music, and which may be selected from a list, as described. An exemplary music effects instruction is shown in FIG. 11 and generally designated by the reference numeral 1120, e.g., dramatic music, and the visualization of the scene with the musical effect is set forth in the aforesaid visualization panel, generally designated by the reference numeral 1130, e.g., in the aforementioned medium shot.

As with the sound effect, the instruction 1120 is visualized the camera preferably shows the same shot as the instruction before. When the instruction 1120 is played, an intro sequence of the music preferably starts playing, which then is replaced with a looping sequence of the music, and will preferably keep playing until another music instruction is played or until the manuscript reaches the end. It should be understood that the transition between the sequences (both intro to loop and loop to loop) of the music is preferably beat synced, which is a technique commonly used when transitioning between two audio clips. In this manner, the system listens for an exact beat and then starts playing the second clip. The aforesaid beat is preferably specified by the composer when adding the musical theme to the content database.

As described in connection with FIG. 1, the visualization backend 130 takes the various aforesaid instructions that the user has created in the user interface 120 and generates a visualization for them in real time. It should be understood that this visualization can either be a single frame, showing a preview of the instruction currently being edited, or it can be in a sequence, such as a film, showing several instructions usually the whole manuscript. It should be understood that in a film showing the film starts with a scene and instructions therefor, such as scene 1, and then proceeds serially and chronologically therefrom, i.e., to scene 2, scene 3 and so forth, serially executing the instructions. It should, of course, be understood that the film or portions thereof can be contoured by the user for playback, e.g., starting with scene X and ending with scene Y, including movement backwards where useful.

To accomplish the real time visualization of the instructions, the backend 130 preferably includes a variety of subsystems that contribute to the visualization process and act in concert to create a seamless virtual environment. For example, the backend 130 preferably includes a real time 3D engine, e.g., a chipset typically used for games, to generate the visualization of the manuscript, i.e., the processor 250, a dedicated processor 250 or an additional chipset in conjunction with the aforesaid hardware 240 and the processor 250, as is understood in the art. The 3D engine handles loading and displaying 3D content on the screen 210, and playing audio and music through speakers or audio output of the system 200, generally designated by the reference numeral 280, which can be wireline and/or wireless, as is understood in the art. Preferably, an industry standard game engine, Unity 3D, is employed, but it should be understood that any game or real time 3D engine could currently be used to implement this capability for the aforesaid backend 130, as is understood in the art. In the preferred invention, the 3D engine 250 is the host process for the entire system 200, but it should be understood that the user interface 120, such as displayed on the display 210, could be run separately, and communicate with the visualization backend 130 through other means, e.g., HTTP.

As discussed hereinabove e backend 130 preferably also includes a content database, which contains the content that will be used to visualize the manuscript. It should be understood that this can include 3D characters, 3D environments, animations, facial expressions, sound files, music files, or other data or metadata needed to generate the visualization. All choices that the user can make, e.g. when choosing characters, environments, actions, or sounds, as described hereinabove, may thus be limited to the content available in the content database, which may be stored in the aforementioned database 270 in FIG. 2 and/or in memory 260. By delimiting the choices, this makes it immediately clear to the user what the system can visualize, and makes it impossible for the user to input a manuscript that the system cannot visualize. As discussed, however, the parameters within the content database 270 can be modified to adjust, remove and/or add a scene, character, action, movement, sound, music and other instructions, as is understood in the art.

The content database 270 preferably contains the following: a list of characters, a list of environments, with locations where characters can sit or stand in each, a list of expressions that characters can have when speaking, a list of actions that characters can do to each other, a list of movements that characters can move with, a list of sound effects that can be played, a list of music or musical themes that can be played, and any other character or environment data useful for the rendering. It should be understood that each content item in one of the lists maps to one or more content files needed to visualize that piece of content. For example, a sound effect maps to a single audio file, but a music theme may map to several audio files. The content available in the database 270 can be extended by the user by buying more content in a content store, such as may be included with the system 100/200. As shown, the content database 270 can be wireline, wireless or both in connecting to the system 100/200.

As discussed, the backend 130 preferably also includes a text-to-speech system. As is understood in the art, a text-to-speech (TTS) system is responsible for converting the text in a dialogue instruction into audio that the user can hear. The TTS system, which may be stored on the computer system 200, such as in database 270, generates both an audio clip and phoneme data for that audio clip. Preferably, a text-to-speech engine from Ivona is employed, but any industry standard text-to-speech system will suffice. The generated audio clip can be used as is, but the phoneme data is preferably sent to a lip synchronization system, described hereinbelow, to generate data that can be used by blend shapes in characters to produce lip synchronization.

In a currently-preferred embodiment, a lip synchronization system developed in conjunction with Jonas Beskow, who is a professor at KTH (Royal Institute of Technology), is employed to implement this functionality. It should, of course, be understood that alternate techniques for implementing lip synchronization are contemplated, and may be employed in implementing this functionality.

It should be understood that preferred lip synchronization systems employed in conjunction with the present invention have three primary components. The first said component is the aforesaid TTS engine, such as by Ivona, to generate text-to-speech from the user-typed text. This TTS engine, e.g., in processor 250, generates an audio file along with a metadata file that includes phoneme data which are stored in database 270, memory 260 or both. This describes the audio generated in terms of what phoneme is uttered at a specific time.

The second component of the process is to pass along this phoneme data to the aforesaid lip synchronization system, which splits apart the various phonemes into individual channels. In this embodiment of the invention, one channel is given to each main phoneme, while less important phonemes are pruned away. It should be understood that this technique keeps the important phonemes that describe the overall movement of the lips when talking, which with fewer calculations and data to process, allows for much faster playback. The list of the phonemes employed to practice the present invention include, e.g., WQ, I, Upper Lip up/down, Lower Lip up/down and jawbone movement, as an auxiliary channel to control how open the mouth should be during various stages of the dialogue. It should, of course, be understood that additional and alternative phonemes may also be so employed.

It should be understood that the system is preferably interchangeable, meaning that the TTS engine can easily be switched to another one or handle phoneme data from completely different sources. This is because the system preferably keeps an internal representation of all the main phonemes, with the ability to further extend its database. Should the incoming phoneme data contain unknown phoneme channels, then these are simply ignored until it gets a representation in the mapping database, which allows mapping any incoming data to any output channel desired.

The third component and final stage of the lip synchronization process is to visualize all this to the user in the form of a virtual characters lips being moved, according to all the data generated in the previous step. A preferred approach to lip synchronization animation is to use a modified version of the FACS system (Facial Action Coding System), which tends to emulate the human anatomy in the face, being a systematic analysis of facial muscles used in computer graphics animation, and known in the art.

The FACS system breaks down key regions and muscle groups and organizes them into clusters. Simulating the full range of human emotion takes hundreds of inputs because of the many fine muscles located in and around the human face, which quickly becomes an intractable problem. Indeed, a more complete FACS model takes about 46 action units (muscle groups) to fully emulate all of human emotion and speech, which is difficult to accomplish in real time. The model of the present invention has generalized this further into 26 action units, which are enough to map almost all possible expressions in the instant application, and making the computation tractable and in real time.

Since the lip synchronization system allows mapping to any output, the methodology of the instant invention allows plugging the generated column data into an approximate shape that describes the lip movement that the column describes. The actual playing of the lip data is preferably done in a delta independent way that has a fixed frame rate of 30 frames per second. A slower system unable to play at the desired frame rate would be subject to frame skips in the data. This is to maintain synchronization with the audio data.

The actual geometry shapes that describe the change in the face is preferably handled by means of blendshapes, which articulate discrete, hand-crafted animations of expressions. A listing of preferred blendshapes pursuant to the instant invention include nose_up, lip_upperUp, brow_innerUpL, corner_down, brow_middledownL, mouth_sideL, brow_innerUpR, mouth_sideR, brow_middledownR, lip_raiser, I, M, lip_upperdown, corner_out, corner_up, cheek_up, corner_in, mouth_up, brow_middleUpL, Brow_middleUpR, brow_innerdownR, Lip_lowerdown, brow_innerdownL, brow_scrunch, and baseHeadGeo, each of which address and control particular facial features, as their respective names suggest.

The following mathematical formula describes how a blendshape, such as one or more of the above, is implemented: Original−Change=Difference, Original+Difference*factor=New Shape. In this manner, discrete facial expressions and mannerisms can be better portrayed in real time on systems employing the principles of the present invention.

The changes are preferably stored as three-dimensional vectors in the local space of the object, e.g., a data file stored in memory 260. This allows the difference vector to manipulate the object completely independent from the skeleton animation system.

When the user is finished with their manuscript, they can preferably export the visualization of the manuscript as a video file, which includes one or more audio files therein also. It should be understood that the export system, e.g., governed by the processor 250, captures the frames and audio visualized by the backend system 130 and sends the information through a TCP socket of the computer to another application running in the background that records them into a video file, which may be stored in memory 260. This separate application, pursuant to a Fast Forward Moving Pictures Expert Group (FFMPEG) protocol, is preferably an open source application, encoding the frames and audio data into a MP4 file that can be played by most video players. In the instant application, the MP4 file is then uploaded to a server and perhaps a social network, where the user can watch the video and share it with others, such as through a wireline or wireless (or both) connector, generally designated by the reference numeral 290, to the Internet, generally designated by the reference numeral 295. A system 200 like this could, however, give the user access to the MP4 file to use as they see fit, for example, for further editing in other programs or uploading to other servers or social networks, as discussed, permitting others to view and perhaps edit the generated work. Additionally, the connectivity 290 permits the user to download or import a like-generated manuscript or movie and edit that as well.

It should be understood that the user, through the manuscript panel 320 and other panels, along with the visualization of the text and other commands, will be able to navigate through the manuscript/movie to modify specific instructions and modify the timeline by rearranging and deleting instructions, e.g., cutting and pasting. For example, scenes (with dialogue) may be moved in tow to a different part of the manuscript for better story telling or coherency. The writer/user is thus fully able to cut and paste correlated dialogue and scenes freely, making the writing and re-writing process easier.

With further reference to FIG. 2, the user may search the database 270 (or memory 260), such as with a text recognition script to search a manuscript, an imported textual source document, or other work for certain key words. For example, one may search for the words "says", "angry", "walks", "bedroom", as well as phrases. With many thousands of such keywords defined in a database 270, the user will trigger search events in the text recognition script, displayed on the computer display 210. For example, "says" will trigger an event to fetch a word before "says" and a part (sentence) behind "says". The result could end up looking something like this, "Ronja says: 'I find it strange that you are seeing this girl every night, Matthew'". The script may create instructions in a manuscript from an imported manuscript, making it ready for use and editing with the previously mentioned click-interface. Thus, the coherency and continuity of a manuscript may be more readily tested. It should, of course, be understood that the aforedescribed text recognition is an exemplary implementation of the principles of the present invention, and other embodiments are envisioned.

With reference again to camera placement, all input to system 200 preferably goes through the aforesaid user interface 120 layer of the application, where the data is transformed into meaningful commands that the virtual camera system/application can understand. As described hereinabove, the present invention generates accurate and visually-appealing representations of environments and actors in various environments, e.g., by using sophisticated camera rules and algorithms to determine proper placement within the virtual environment, e.g., pursuant to an industry standard. Instead of many other more data-driven, fully procedural approaches, the instant invention employs a more hybridized solution, relying on basic user input, virtual environment settings and real world camera rules to position itself automatically and in real time. Furthermore, by also allowing an actual person to determine a frame of reference for the camera in the virtual environment, the technique of the present invention can easily extrapolate other data from this without the need for complicated spatial orientation algorithms.

With reference again to FIG. 2, it should, of course, be understood that a virtual camera is representative of a vantage point, point of view or point of reference, which is displayed on the screen 210, and governed by the software in the computer system 100/200, such as may be stored in the memory 260 and/or database/server 270, and governed by the processor 250. A program or system, such as stored in memory 260, when in operation procedurally places/animates the virtual camera object or objects, i.e., the images within that viewpoint, according to application input. As described, the present invention uses application input, e.g., characters, movements and actions, to determine proper algorithm choices, which then results in proper framing of said applications actor/actors and/or content. The technique and methodology of the present invention preferably relies on minimal user input and self-determines a preferred proper course of action in order to generate appealing visual output. It should be understood that this can most easily be described in the form of a linear non-complex state machine, where the virtual camera stores current position data in the environment relative to where the actor/actors are. This data is then stored in an internal model that handles all camera control, which allows the next movement and/or placement of the camera to relate to its previous state in order to determine the next one, as described in more detail hereinabove.

In a preferred embodiment, the user interface 120 layer interacts directly with an application core that determines what the user wishes to visualize. Additionally, the present invention is directed to a technique where visualization happens in a similar fashion to "story boarding" found in the entertainment industry. However, the present invention is quite unlike this more offline and costly counterpart. Instead, the system of the present invention does this story boarding in real time and gives immediate user feedback, by showing the images on any given device supporting the application.

Additionally, by using a fixed aspect ratio, such as 16:9, the instant application presents the output format exactly the same on any given device and screen size. In an effort to generate accurate placement and representation of a given action/plot, the present invention preferably has a pool of various algorithms that adhere to various camera rules set up by movie institutions and conventions, as discussed hereinabove. Also, by use of a ray intersection algorithm to determine camera final position based on the desired "look at" position, a ray is sent toward a final camera position. This functionality is preferably implemented by using the "Möller-Trumbore ray-triangle intersection algorithm," an algorithm appropriate for use in real time applications, such as in the instant invention since it yields fast results with minimal performance overhead.

Preferably, the present invention uses simple box shapes in the virtual environment to represent objects where collision can occur. As is understood, this is required in order to save on performance and make the instant application perform smoothly at run time.

Using vector sorting, the final position of a virtual camera can be determined regardless of placement in the virtual environment. In order to calculate the camera's position, the actors respective right-facing directions in their local frame of reference are placed in a data object, which is then analyzed and the resulting 3D vectors are sorted in a descending order. The algorithm employed in the instant invention then chooses the highest ranking result from this sort. It should be understood that the camera placement preferably adheres to the 180 degree camera rule even if the camera is switched to another actor's point of reference, making sure it never crosses in a straight orthogonal line across the line of action.

In order to get spatial control of the virtual environment, the present invention preferably employs reflection algorithms to determine placement of the virtual camera, such as pursuant to a formula:

$$R = 2\left(\left(\frac{N \cdot L}{|N|^2}\right)N\right) - L$$

Where R is a reflection vector, N is a normal vector, L is a comparison vector to be reflected, and |N| is the length/magnitude of the normal vector. This simple formula allows the system of the present invention to easily place a camera from one actor's point of view to the next by simply reflecting the current viewing angle and position.

Initial virtual camera placement is determined by input from the application and the chosen virtual environment. This initial placement is then used to determine the "Line of Action" of any given scene. By using this we adhere to more well established camera rules that allows us to make fast paced manuscript without confusing the viewer and presenting the viewer with something familiar while watching animated content.

It should be understood that the system and methodology of the present invention enables overriding behaviors based on the virtual content and environment being displayed. Some scenarios require handling various placements and framing differently in order to present the viewer with appealing output. The overriding behavior is included with the environment and/or content itself, and requests the camera to treat it differently. e.g., a viewpoint inside of a car requires a more tightly confined camera focal point, and requires the placement of camera position to factor in a more tightly enclosed space.

In addition to the generation of expressions, such as via the many blendshapes described hereinabove, the present invention is also directed to the animation of the bodies of the avatars so generated and visualized. In yet another embodiment of the present invention there are described herein a system and methodology for generating body language based on simple "User Interface" input. To accomplish this, the present invention relies on a pool of hand-crafted animations, which are later augmented and/or changed depending on application input and requirements. This leads to procedurally changing the source animation and its state to suit the current needs of the application.

The present invention aims to generate body language based on this simple output. The idea rest of the fundament of little input, large output, where simple text data and expression selection is transformed into something more complex, generating appealing body language animations. In a currently preferred embodiment, a Mechanin animation system, such as made by Unity technologies, may be employed to practice and implement some of these capabilities.

In general, a state machine keeps track of each individual actor's animation state, where the state machine pursuant to the present invention has three layers of state: controlling the three primary body parts, i.e., the head, upper body and lower body. By allowing individual body part manipulation, the runtime memory footprint is minimized and the amount of animations required are reduced. The present invention also simply reuses body part animations from other states and combines them into completely new ones, allowing for vast amounts of granularity in animations and providing a nice variation in body language behaviors.

Further to the aforesaid FACS, the present invention in this embodiment includes an adaptable facial animation system, which stores all data in data tables at runtime. By allowing direct F curve access, the present invention easily manipulates and augments the animations desire. Further, the F curve describes a fixed and known polynomial function, using no quadratic or Bezier behaviors. Furthermore, using raw point data for every frame, yields a known output and frame of reference, thereby making it easy to change the data by scalar values or trigonometric functions. Rotations are preferably stored in the form of a three dimensional vector, while simpler one-channel animations are stored as floating point numbers. The F curve data is preferably compressed and optimized in an offline environment to determine the amount of animation contributed with. Channels who do not meet the requirement are pruned away and not included in the data tables at runtime, leading to less memory usage and easier reads from the data table.

All of the animations of the present invention are preferably retargetable to any actor in the application, allowing the production of a specific animation only once and reusing it on a pool of actors. Regardless if they are user created in our own character creation tool or if they are one of the pre-created by a content team this is achieved by using simple and similar skeletal hierarchies between actors in the application.

To ensure that all animations are retargetable and will work on a wide range of different actors, the instant invention makes sure that all underlying skeletons for all actors share a similar structure and bone proportions. This is most important around the clavicle/arm and the neck area since these areas have a wide range of movement. This also leads to a more predictable interaction between actors, since no assumptions have to be made on arm reach and chest/neck rotations. Using this rule, there are a fixed set of coordinates for various body animations and interactions, meaning that the same base animation for all characters may be used regardless of gender or differentiating body masses.

A system to generate animation states based on user input. Based on the user selected choice. This state is later augmented and changed depending on the actor's position in the virtual environment. Such augmentations come in the form of mirroring actor poses and/or facial poses. The underlying application framework determines these augmentations based on the current state of the application.

Mirroring of animation states is performed by transforming the opposing actor's position into the local space of the primary actor, which is simply a matter of multiplying the opposing actor's position by the inverse of the primary actor's transform matrix. This is described in the following formula:

$A^{-1}*p$ where A is the inverse transformation matrix of the primary actor and p is the opposing character's position.

In another embodiment of the present invention, there is shown a methodology and system employing animation backend nodes that keep track of the current animations being played, and feeds in relevant data about its length and what other actors in the same virtual environment should do. This backend is preferably generated offline, and is stored in various data tables at run time, such as in memory 260 or in database 270, as described. The data in these tables can, however, later be mutated in their place to adjust for changing variables in our application. By storing data about the animation's length, how long it takes to transition into this animation, and appropriate times on when to exit the animation, the techniques of the present invention can ensure smooth transition to the next animation, and also eliminate complex computation and error prone systems that would otherwise be required to compute all this information at run time in the application.

Figure 12:
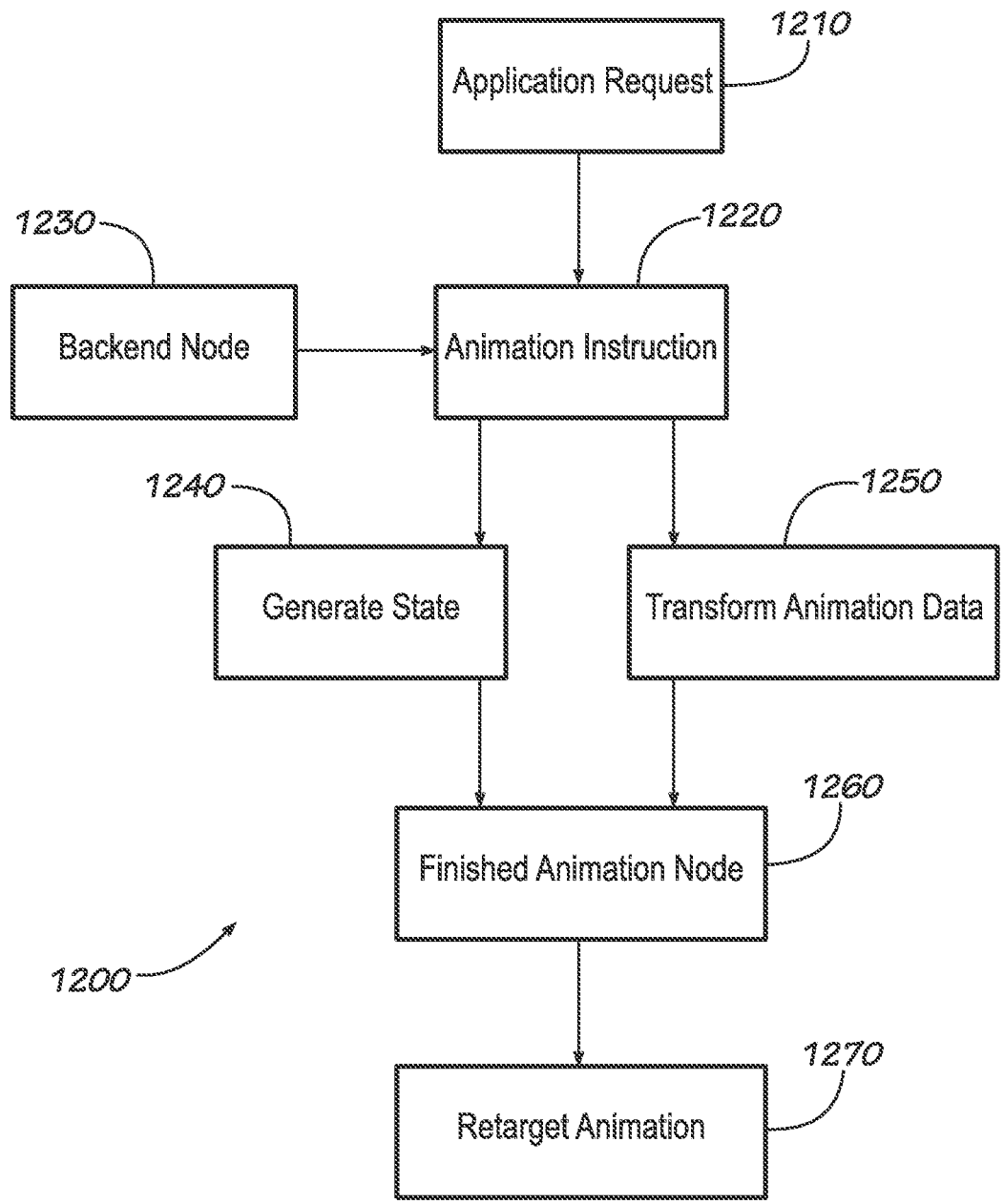
FIG. 12 is a representation of a flowchart for determining body language pursuant to the principles of the present invention.

With reference now to FIG. 12 of the DRAWINGS, there is shown a diagram illustrating the logic flow of applications according to a preferred embodiment of the body language system and methodology of the instant invention, generally designated by the reference numeral 1200. As shown, an application request 1210 becomes an animation instruction 1220, which receives a feed from a backend node 1230 with pertinent information about current animations. An animation state is then generated 1240, and the animation data transformed 1250, resulting in a finished animation node 1260. After this, the animation is retargeted 1270, as described hereinabove.

In this fashion, the system and methodology of the present invention generates seamlessly-blended animations based on a predictable flow of actions. Using a system where each consecutive action is stored and analyzed, the system pursuant to the instant invention allows the calculation of accurate transition times between animations so as to keep it fluid and natural.

The present invention thus makes it easy to extend and branch out its logic further as new innovations are made or changes are required. For example, there could be logic for gender-specific states, where animations could depend on the virtual actor's gender or certain physical attributes, e.g., amputees, deformities, skin conditions, racial characteristics, obesity and other human differentiators.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed is:

1. A rendering tool for manuscript visualization comprising:

an input interface, a user using said input interface to input at least one instruction for a manuscript, said manuscript describing a virtual environment representative of at least one scene in said manuscript with at least one scene character therein, said at least one instruction containing a character scene command, wherein said user inputs said at least one instruction in a first manuscript format, said manuscript being in said first manuscript format;

a switch, said user using said switch to switch said manuscript from said first manuscript format to another manuscript format, wherein, after said switch to said another manuscript format, said user using said input interface inputs another instruction for said manuscript in said another manuscript format, wherein said user, after inputting said another instruction in said another manuscript format, using said switch, switches said manuscript back to said first manuscript format and, using said input interface, inputs a further instruction for said manuscript in said first manuscript format; and a synchronizer, said synchronizer synchronizing said character scene command in said at least one instruction to a rendering of a particular scene character in a given scene in said virtual environment, wherein said rendering in said virtual environment is independent of the manuscript format of said manuscript, whereby a non-verbal, visual feature of said particular scene character is altered by said character scene command, said non-verbal, visual feature being concurrently visualized in said another format.

2. The rendering tool according to claim 1, wherein said at least one instruction for said manuscript is selected from the group consisting of scenes, characters, verbal and non-verbal dialogue, human and animal movement, inanimate objects, action, interactions, audio, visuals, music, animation, body movement, lip movement, facial movement and combinations thereof.

3. The rendering tool according to claim 1, wherein said character command is to speak dialogue, and said synchronizer synchronizes text of said dialogue to lip movement of said particular character in said virtual environment.

4. The rendering tool according to claim 3, wherein said synchronizer passes said text of said dialogue through a text-to-speech system, generating an audio file and metadata associated therewith.

5. The rendering tool according to claim 4, wherein said text-to-speech system generates phoneme data, said phoneme data being divided into a plurality of respective channels.

6. The rendering tool according to claim 5, wherein said phoneme data comprises phonemes selected from the group consisting of WQ, I, Upper Lip up/down, Lower Lip up/down, and jawbone movement governing mouth opening.

7. The rendering tool according to claim 5, wherein said synchronizer maps said phoneme data from said plurality of respective channels to lip movement of said particular character.

8. The rendering tool according to claim 7, wherein said synchronizer employs an algorithm based on a Facial Action Coding System (FACS) in the mapping, wherein the length of the audio file is employed to map lip animation to said phoneme data.

9. The rendering tool according to claim 7, wherein said synchronizer employs a plurality of blendshapes to control facial features of said particular character, and mimic speaking said dialogue thereby.

10. The rendering tool according to claim 1, wherein said character command is to alter body position, and said synchronizer synchronizes text of said manuscript to alter at least one body position of said particular character.

11. The rendering tool according to claim 10, wherein said character command to alter body position includes a body part selected from the group of consisting of head, upper body, lower body and combinations thereof.

12. The rendering tool according to claim 10, wherein said character command is to gesture, and said synchronizer synchronizes text of said manuscript to alter at least one body position of said particular character to visualize said gesture.

13. The rendering tool according to claim 12, wherein said gesture is a head gesture.

14. The rendering tool according to claim 13, wherein said head gesture is selected from the group consisting of nods, winks, smirks, shaking of head no, disgust, alarm, terror and combinations thereof.

15. The rendering tool according to claim 12, wherein said gesture is an arm or leg gesture.

16. The rendering tool according to claim 12, wherein said gesture is a hand gesture.

17. The rendering tool according to claim 12, wherein said gesture is of at least one finger.

18. The rendering tool according to claim 1, wherein said character command is to alter a facial expression, and said synchronizer synchronizes text of said manuscript to alter at least one facial expression of said particular character.

19. The rendering tool according to claim 1, wherein said character command is to alter an emotion or mood of a particular character, and said synchronizer synchronizes at least one facial expression of said particular character with an emotion or mood sample stored on a database.

20. The rendering tool according to claim 1, wherein said synchronizer is connected to an animation database, said animation database containing a plurality of standard character attributes therein.

21. The rendering tool according to claim 20, wherein a plurality of retargetable characters in said virtual environment have said standard character attributes.

22. The rendering tool according to claim 1, wherein said particular character in a particular scene in said manuscript has a first animation state associated therewith, said particular character having a second animation state in a subsequent scene in said manuscript, and wherein said first animation state of said particular character is transformed and blended into said second animation state.

23. A method for rendering images in a visualization tool comprising:
  inputting, by a user into an input interface, at least one instruction for a manuscript, said manuscript describing a virtual environment representative of at least one scene in said manuscript with at least one scene character therein, said at least one instruction containing a character scene command;
  switching, by said user using a switch, said manuscript from a first manuscript format to another manuscript format;
  after said switching to said another manuscript format, said user using said input interface inputs another instruction for said manuscript in said another manuscript format,
  wherein said user, after inputting said another instruction in said another manuscript format, using said switch, switches said manuscript back to said first manuscript format and, using said input interface, inputs a further instruction for said manuscript in said first manuscript format;
  synchronizing, by a synchronizer, said character scene command in said at least one instruction to a rendering of a particular scene character in said virtual environment; and
  visualizing, in a visualization interface, said particular scene character altered by said character scene command,
  wherein said visualizing is independent of the format of said manuscript,
  whereby a non-verbal, visual feature of said particular scene character is altered by said character scene command, said non-verbal, visual feature being concurrently visualized in said another format.

* * * * *